July 9, 1940. D. F. ALEXANDER ET AL Re. 21,503

REFRIGERATING APPARATUS

Original Filed Jan. 2, 1937 8 Sheets-Sheet 1

D. F. Alexander, R. F. Kenney, C. L. Paulus, INVENTORS

BY Spencer Hardman & Fehr ATTORNEYS

REFRIGERATING APPARATUS
Original Filed Jan. 2, 1937 8 Sheets-Sheet 2
Fig. 3 — 0-15 M.P.H. NO REFRIGERATION NO GENERATION
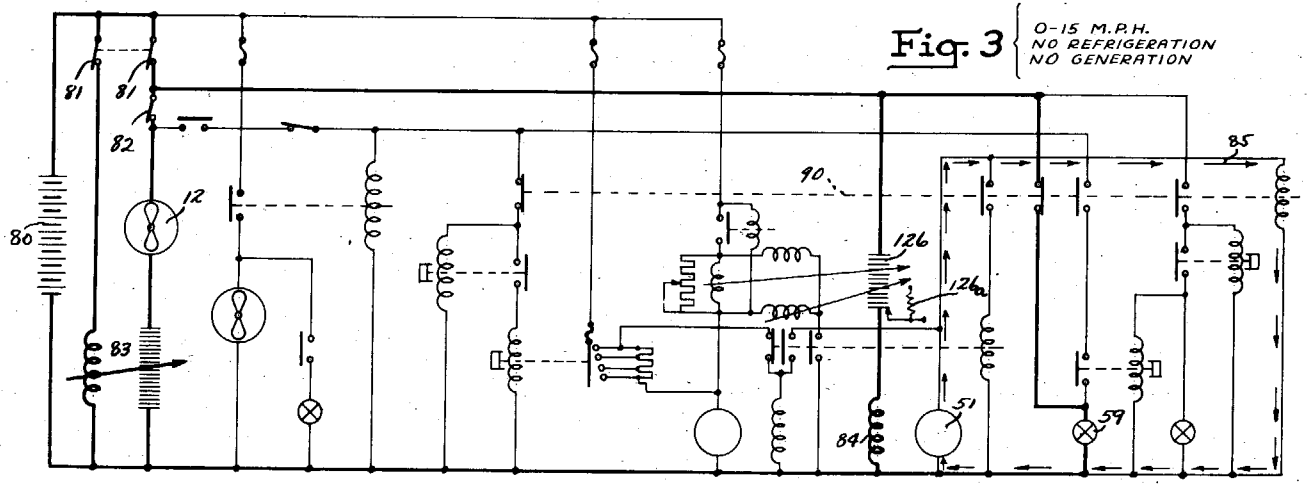
Fig. 4 — 0-15 M.P.H. REFRIGERATION FROM BATTERY NO GENERATION
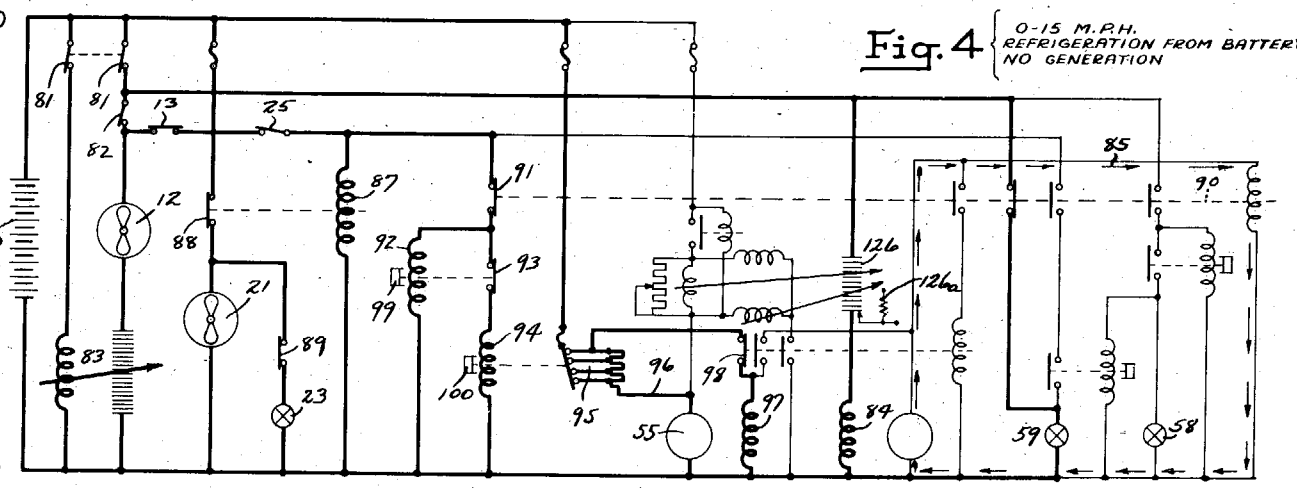
D. F. Alexander, C. F. Kenney, C. L. Paulus, INVENTORS
BY
Spencer, Hardman & Fehr
ATTORNEYS July 9, 1940. D. F. ALEXANDER ET AL Re. 21,503

REFRIGERATING APPARATUS

Original Filed Jan. 2, 1937 8 Sheets-Sheet 3

INVENTORS
D. F. Alexander R. F. Hussey
BY C. L. Paulus,
Spencer Hardway & Fox
ATTORNEYS

REFRIGERATING APPARATUS

Original Filed Jan. 2, 1937 8 Sheets-Sheet 4

INVENTORS
D. F. Alexander C. F. Kemp
BY C. L. Paulus,
Spencer Hardman & Fehr
ATTORNEYS July 9, 1940. D. F. ALEXANDER ET AL. Re. 21,503
REFRIGERATING APPARATUS
Original Filed Jan. 2, 1937 8 Sheets-Sheet 5
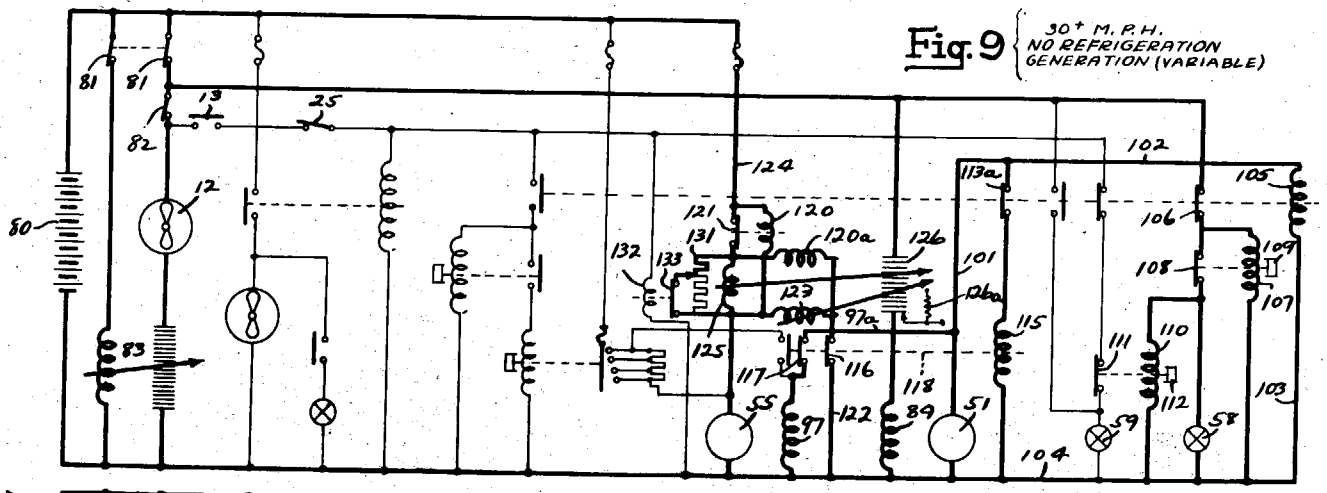
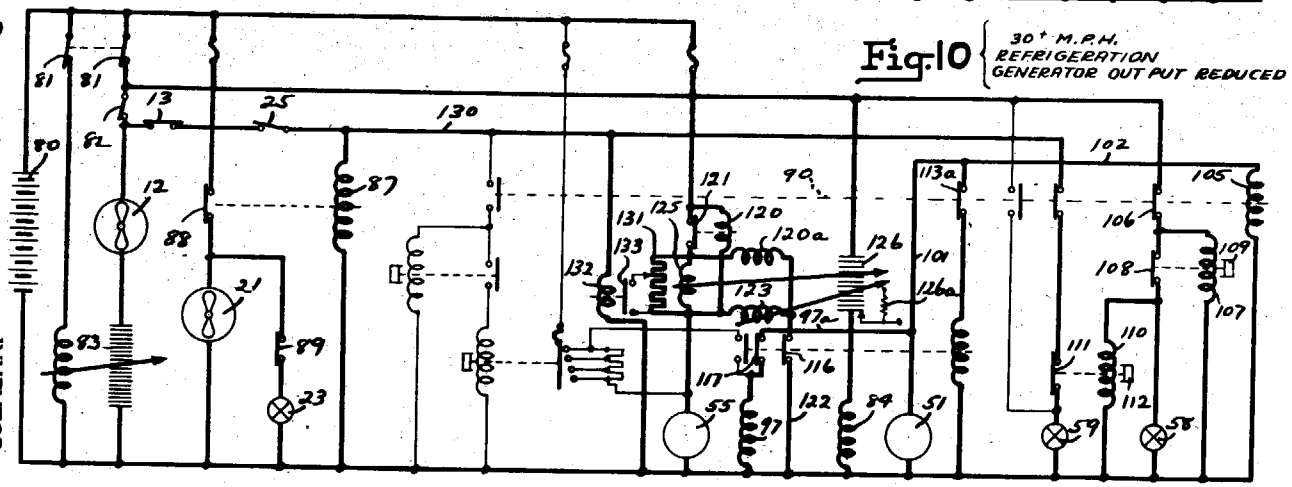
D. F. Alexander, R. F. Kinney, C. L. Parker, INVENTORS
BY Spencer Hardman & Fehr
ATTORNEYS

REFRIGERATING APPARATUS

Original Filed Jan. 2, 1937 8 Sheets-Sheet 6

INVENTORS
D. F. Alexander, C. F. Kenney
BY C. L. Paulus,
Spencer, Hardman & Fehner
ATTORNEYS July 9, 1940. D. F. ALEXANDER ET AL Re. 21,503

REFRIGERATING APPARATUS

Original Filed Jan. 2, 1937 8 Sheets-Sheet 7

D. F. Alexander, C. L. Paulus,
INVENTORS
BY
Spencer Hardman & Fehr
ATTORNEYS

July 9, 1940. D. F. ALEXANDER ET AL Re. 21,503

REFRIGERATING APPARATUS

Original Filed Jan. 2, 1937 8 Sheets-Sheet 8

INVENTORS
D. F. Alexander C. F. Kenney
BY C. L. Paulus,
Spencer Hardman & John
ATTORNEYS Reissued July 9, 1940

Re. 21,503

UNITED STATES PATENT OFFICE 21,503

REFRIGERATING APPARATUS

Donald F. Alexander, Charles F. Henney, and Charles L. Paulus, Dayton, Ohio, assignors to General Motors Corporation, Dayton, Ohio, a corporation of Delaware Original No. 2,104,148, dated January 4, 1938, Serial No. 118,816, January 2, 1937. Renewed May 21, 1937. Application for reissue August 9, 1939, Serial No. 289,329

47 Claims. (Cl. 62—4)

This invention relates to refrigerating apparatus.

An object of this invention is to provide refrigerating or air conditioning apparatus for railway cars or the like in which a part of the refrigerant liquefying unit, such as the compressor, of the air conditioning system is driven from a live axle assembly at certain car speeds, is driven by a motor-generator, acting as a motor, at other car speeds, and the same motor-generator is driven, as a generator, from the live axle assembly at certain car speeds to charge a battery.

While this invention is specifically described in connection with railway cars, many of its features are applicable in other connections. The invention is applicable for example, whenever the operation of a live axle assembly (whether on a moving or stationary structure) is available only at intervals or is available under varying conditions of power output.

Further objects and advantages of the present invention will be apparent from the following description, reference being had to the accompanying drawings, wherein a preferred form of the present invention is clearly shown.

In one modification of this invention, the motor-generator, acting as a motor drives the compressor while the car is in one car speed zone, and the live axle assembly drives the compressor and the motor-generator, as a generator in another car speed zone. An intermediate car speed zone may be provided in which the live axle assembly drives the compressor while the motor-generator is prevented from generating, or is permitted to generate at a reduced rate.

If it is desirable to limit the total power transmitted from the live axle system while obtaining a maximum of usefulness from the power which is available, a further modification is possible; a control is provided to limit the generator power requirement to the amount available beyond that required by the compressor. When the combined power consumption of the compressor and motor-generator would normally exceed the desired transmission load, the motor-generator output is automatically reduced to maintain the total power consumption within the desired limit.

In the preferred modification the drive from the live axle assembly preferably passes through the motor-generator shaft to the compressor, although it is to be understood that many of the advantages of this invention may be derived by other arrangements.

Means are provided to disengage the motor-generator and the compressor from the live axle assembly to permit them to operate independently of the live axle assembly during the lowest car speed zone. This means may take the form of a first clutch or clutch system. Also, means are provided to disengage the compressor from the motor-generator to permit one of them (or both of them) to be operated independently of the other. This may take the form of a second clutch or clutch system.

The motor-generator is provided with means for permitting it to charge the battery regardless of the direction of travel of the car. In the preferred modification this is accomplished by energizing the motor-generator field in such a manner that current from the motor-generator flows in the same direction regardless of the direction of rotation of the armature. Preferably the field is excited by a separate small exciter (generator), which reverses the direction of its output current with a reversal in the direction of car travel, and thus maintains the motor-generator output current in a constant direction regardless of the direction of car travel.

Time delay devices are provided where desirable to prevent a too rapid sequence of automatic operations. Thus, a time delay is provided after the clutch is engaged between the motor-generator and the compressor and before the motor-generator can be energized as a motor to drive the compressor. A time delay also is provided during the change from motor drive of the compressor to live axle drive of the compressor. This allows the compressor (and the motor-generator, if desired) to stop after being driven by the motor before it is driven by the live axle, thus preventing a possible sudden reversal of rotation. A time delay is also provided during the engagement of the various clutches of the clutch system and thus too sudden a loading of the live axle transmission mechanism is prevented.

Speed responsive means are provided for controlling the operation of the parts. The speed responsive means may be combined with the exciter or a separate small generator ultilizing its variable voltages (if driven proportionally to car speed) to operate control relays. If desired, other speed responsive switches may be used, such as switches operated by centrifugal governors.

Proper current and voltage regulation of the motor-generator output is provided. This includes provisions for connecting the motor-generator to the battery when the motor-generator voltage is suitable for charging the battery and for disconnecting it at other times.

Controlling devices are also provided to meet the requirements of battery charging, preferably controlling the exciter field and thus indirectly controlling the main generator.

Proper controls of the parts of the refrigerating system are also provided. Thus a blower is provided for circulating air over the evaporator. A blower is provided for circulating air over the refrigerant condenser, and provisions are made for its operation whenever the compressor is performing work. A control responsive to abnormal conditions, such as abnormally high refrigerant head pressure or abnormally low back pressure, prevents compression when such abnormal conditions exist. It is desirable to spray water on the condenser when surrounding air temperatures are high, and a proper valve responsive to such conditions, is provided for controlling the water spray. A control responsive to air conditions is provided for controlling the operation of the refrigerating system. This may include an automatic switch responsive to air conditions either inside or outside the compartment to be conditioned, or it may be made responsive to inside conditions modified by outside conditions or vice versa. Such instrument may be made responsive to dry bulb, wet bulb, relative humidity, effective temperatures, or a combination of any two or more of these functions. The refrigerant temperature in the evaporator is also automatically maintained sufficiently low to cool and dehumidify the air, but not so cold that moisture is frozen on the surfaces.

While many features have been disclosed as desirable in the preferred form, it is to be understood that some of such features may be omitted while retaining many of the advantages of the invention, and that the disclosure of such features is not intended as a limitation of the scope of this invention.

Figures 1, 2, 16:
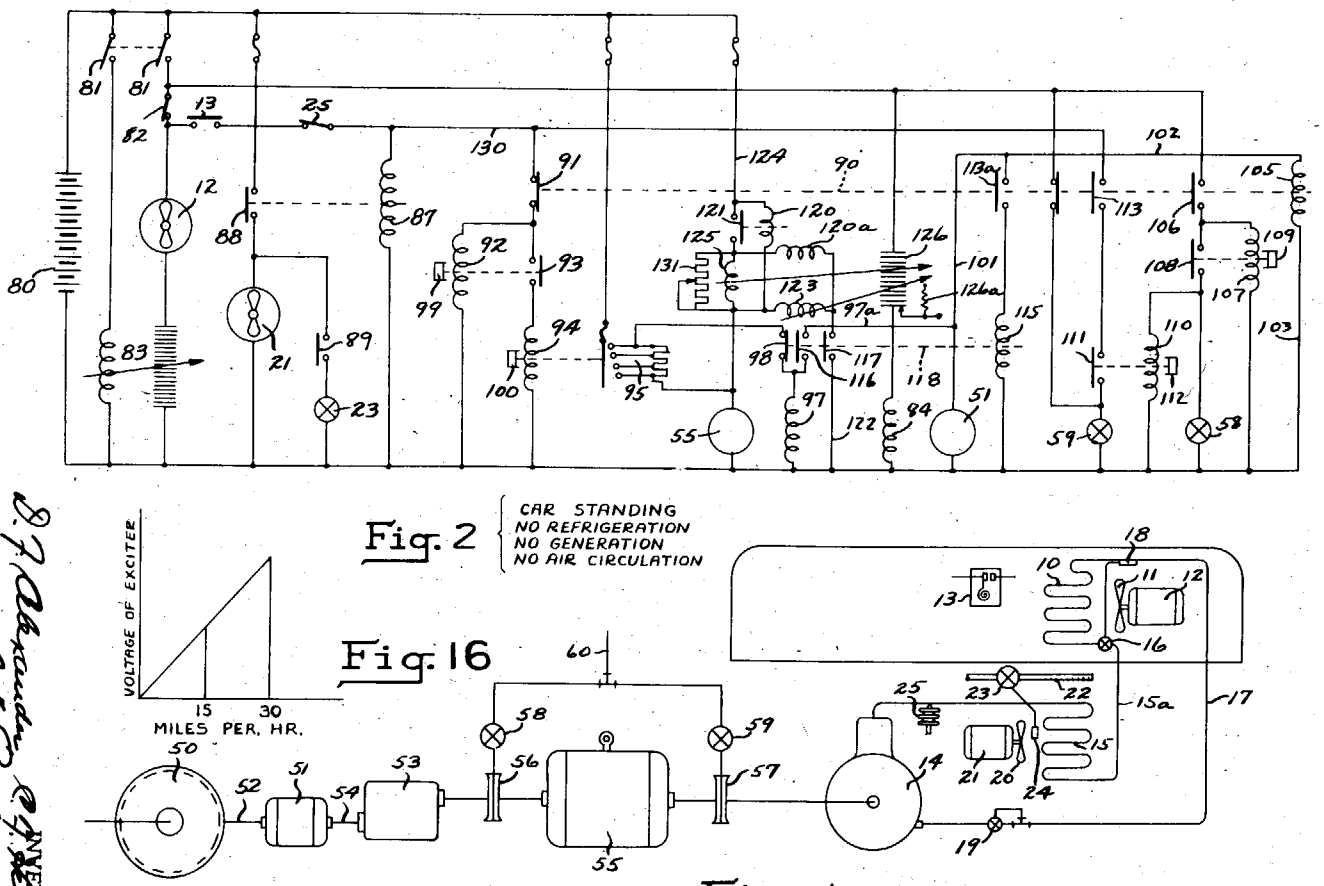
Fig. 1 is a diagrammatic representation of one modification of the invention, showing the refrigerating system, together with drives from the live axle assembly to various parts of the system.
Fig. 2 is a wiring diagram of one form of the invention, showing the electrical parts of the system when the car is standing and no air conditioning is provided.
Figure 5:
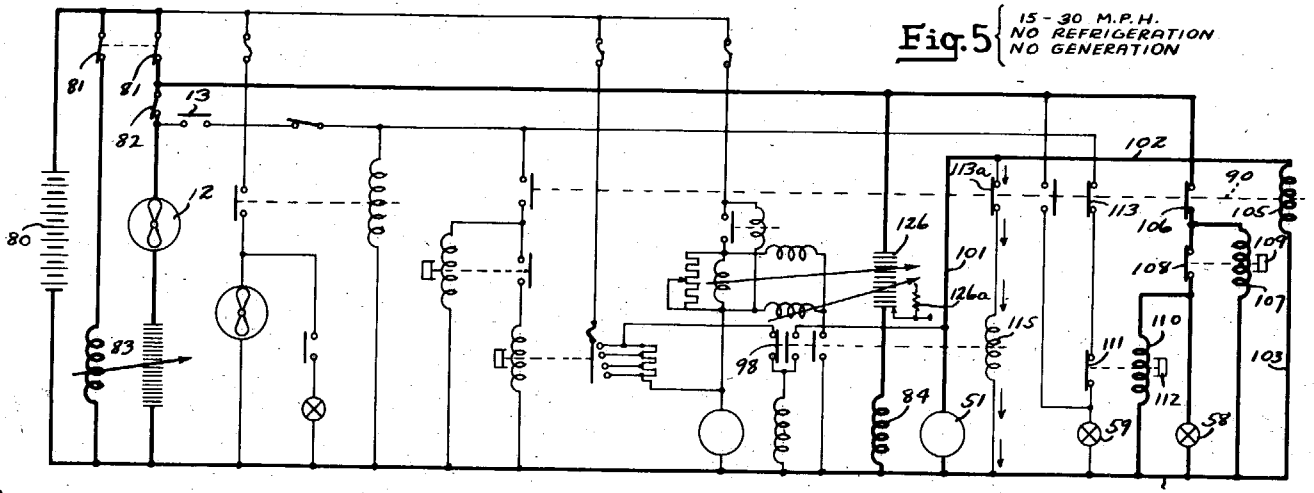
Figure 6:
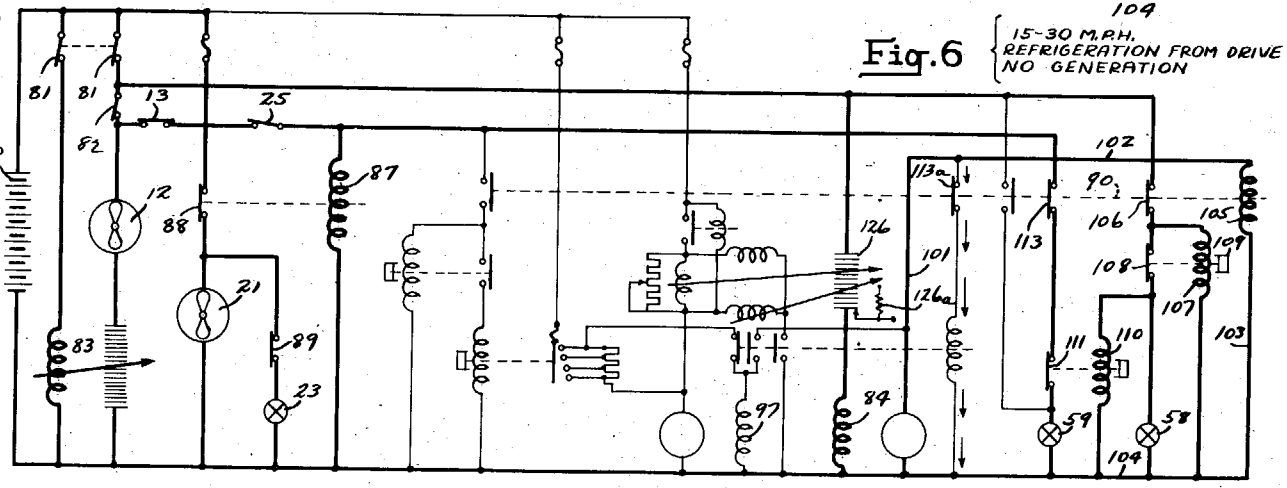
Figure 7:
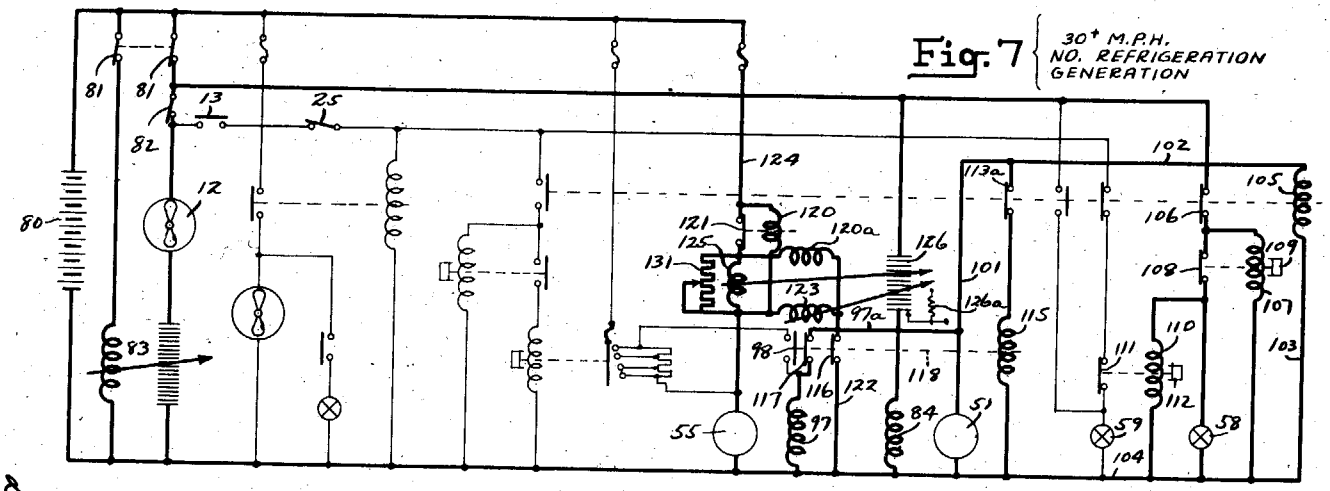
Figure 8:
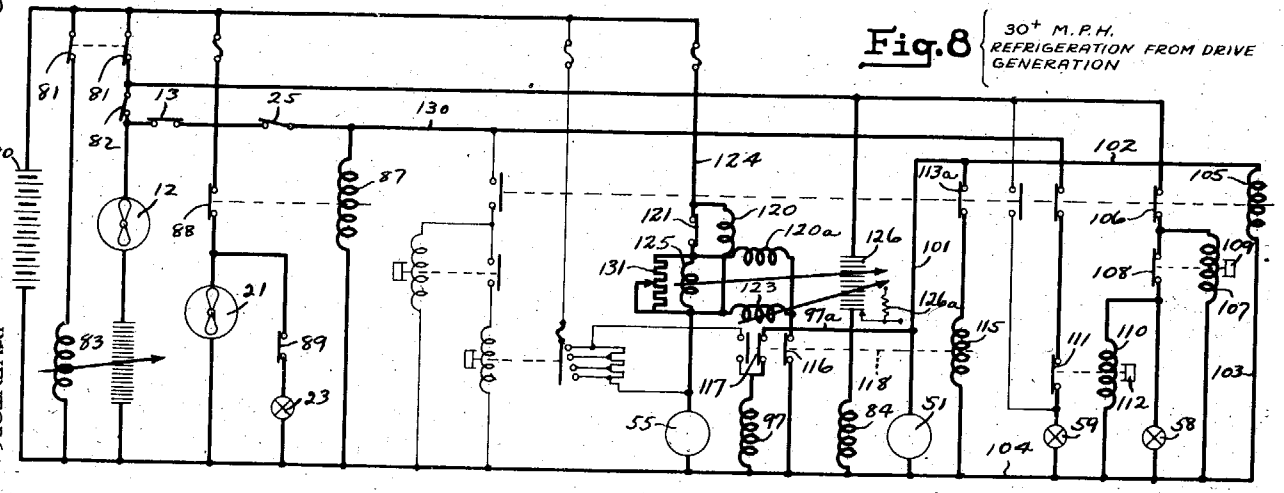
Figure 11:
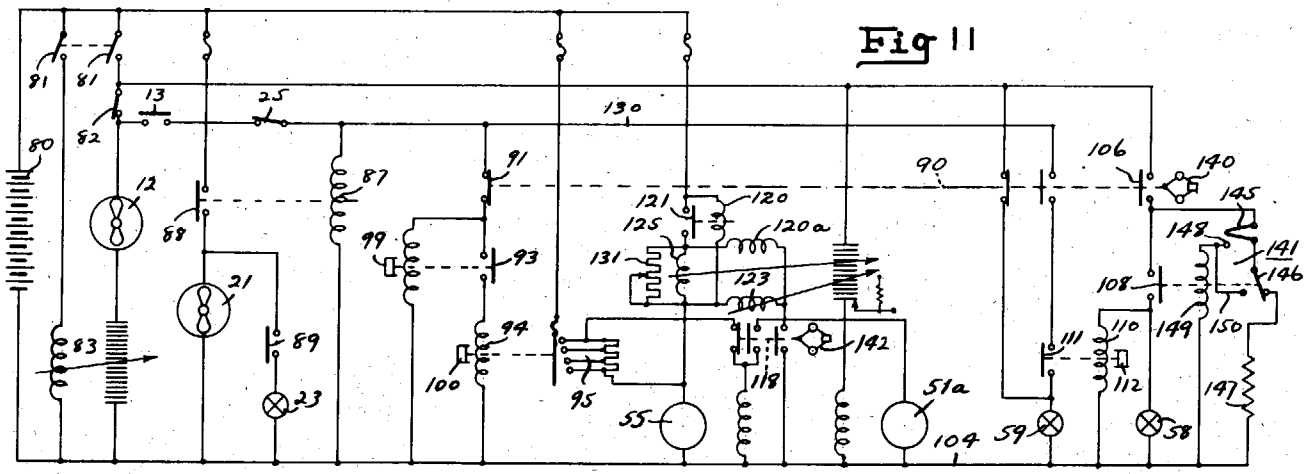
Figure 12:
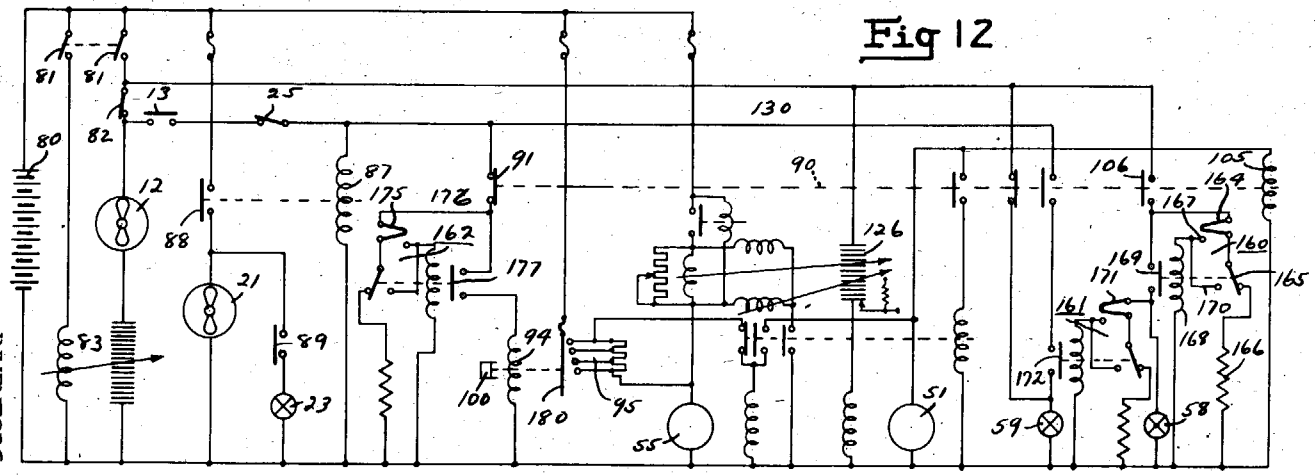
Figure 13:
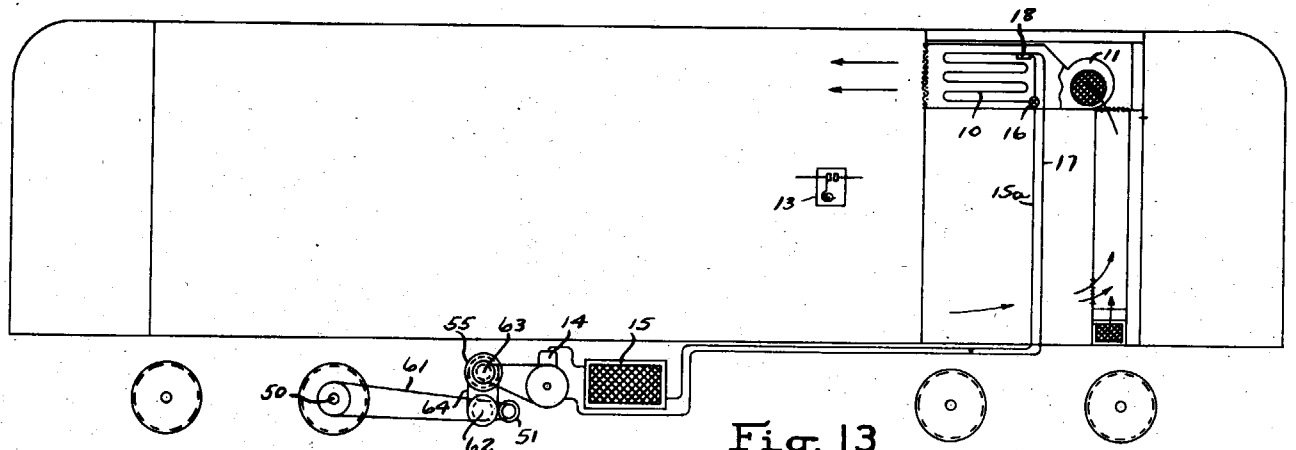
Figure 14:
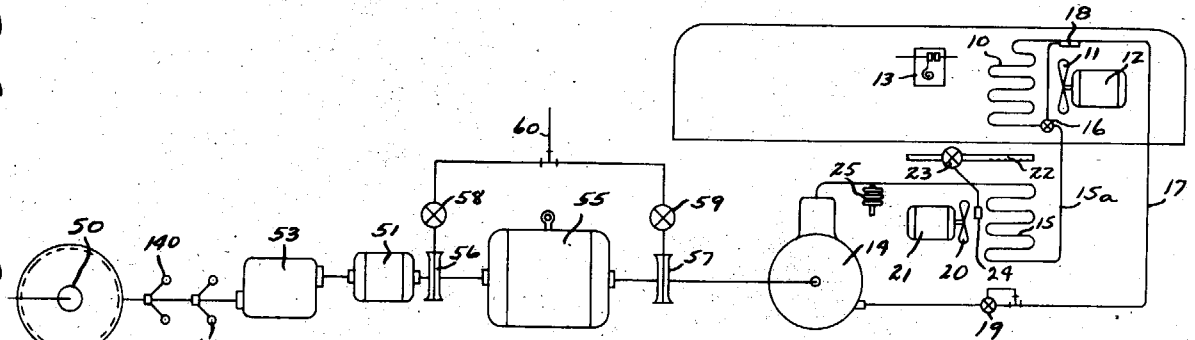
Figure 15:
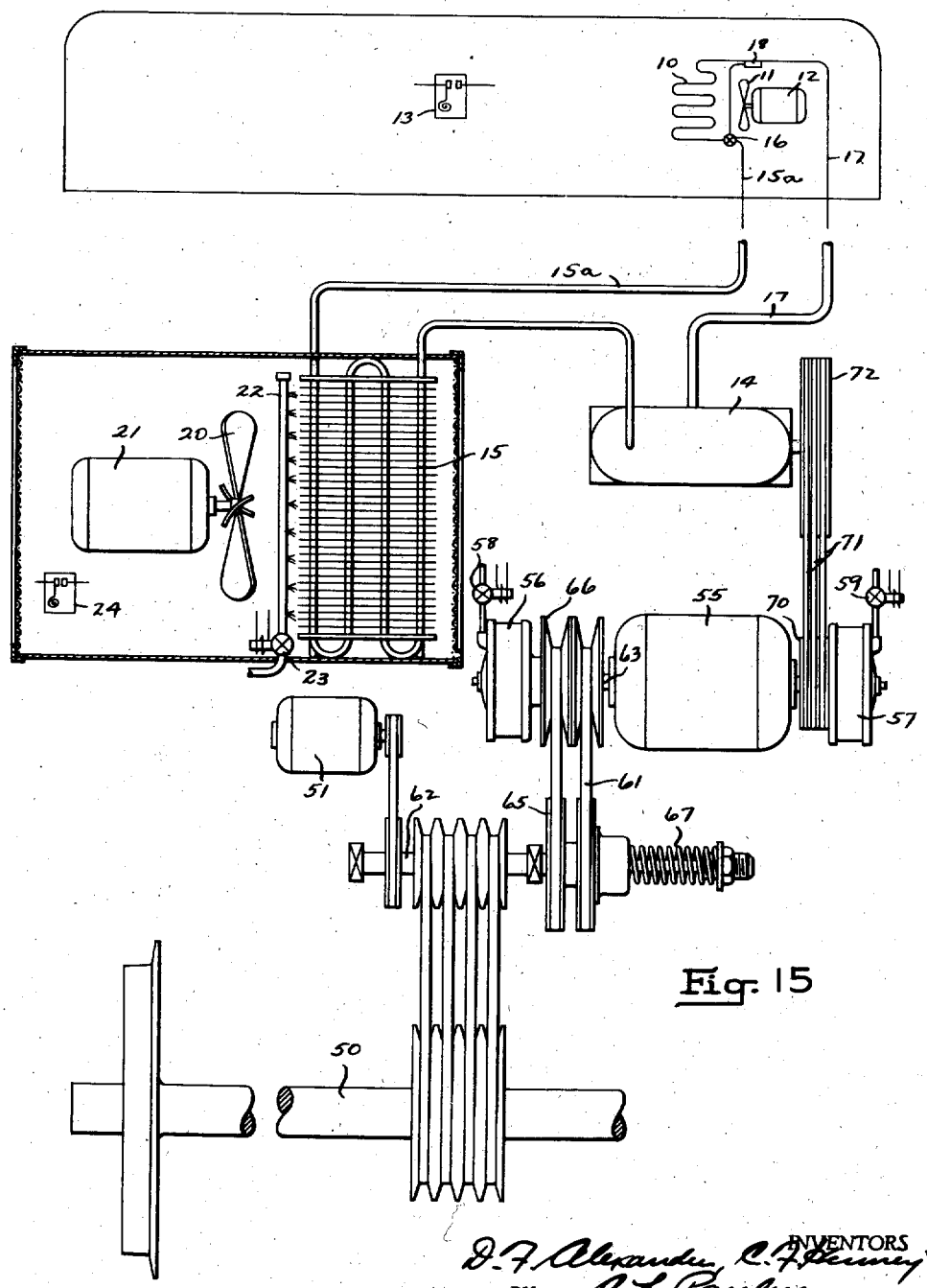

Fig. 3 shows the same wiring diagram disclosed in Fig. 2, with the live circuits in heavy lines, when the car is in its first car speed zone, such as at zero speed or traveling up to 15 M. P. H. with the evaporator blower turned on, but with no refrigeration or generation provided;

Fig. 4 shows the same wiring diagram, with the live circuits in heavy lines, when the car is in its first car speed zone, such as standing or traveling up to 15 M. P. H., with refrigeration power derived from the battery and motor-generator acting as a motor, and with no generation;

Fig. 5 shows the same wiring diagram, with the live circuits in heavy lines, while the car travels in its intermediate car speed zone, such as between 15 and 30 M. P. H., and when no refrigeration and no generation is provided;

Fig. 6 shows the same wiring diagram, with the live circuits in heavy lines, while the car is traveling in its intermediate car speed zone, such as between 15 and 30 M. P. H., when refrigeration power is derived from the live axle assembly, and when no generation is provided;

Fig. 7 shows the same wiring diagram, with the live circuits in heavy lines, while the car travels in its highest car speed zone, such as at 30 or more M. P. H., when generation, but no refrigeration, is provided;

Fig. 8 shows the same wiring diagram, with the live circuits in heavy lines, while the car travels in its highest car speed zone, such as at 30 or more M. P. H., with refrigeration power derived from the live axle assembly and with generation;

Fig. 9 shows a slightly modified wiring diagram, which provides reduction of the generator output to limit the transmission load, the live circuits being shown in heavy lines while the car travels in its highest car speed zone, such as at 30 or more M. P. H., and while generation is provided and no refrigeration;

Fig. 10 shows the same wiring diagram as that disclosed in Fig. 9, the live circuits being shown in heavy lines, while the car is traveling in its highest car speed zone, such as at 30 M. P. H., while refrigeration is provided with power from the axle assembly and while the generator output has been reduced to some fraction of its greatest output;

Fig. 11 shows a wiring diagram of a modified form, somewhat similar to the wiring diagram shown in Fig. 2, but showing the substitution of a centrifugal switch mechanism to be used as a control in lieu of the varying voltage of the exciter armature, and showing the substitution of a thermal-responsive element time delay, in lieu of a pneumatic time delay, in a portion of the circuit;

Fig. 12 shows a wiring diagram somewhat similar to Fig. 2, but in which thermal-responsive element time delay devices have been substituted for pneumatic time delays;

Fig. 13 is a diagrammatic representation, taken along the vertical plane, showing how the apparatus may be mounted on a car;

Fig. 14 is a view, somewhat similar to Fig. 1, but showing centrifugal controls for switches and a slightly different drive for the exciter, as used in conjunction with the wiring diagram of Fig. 11;

Fig. 15 is a plan view showing, somewhat in more detail, the mechanical parts of the unit, with the jack shaft and motor-generator shaft shown slightly out of vertical alignment, for clearer understanding; and Fig. 16 is a diagram indicating the voltage of the exciter armature as used in the wiring diagram of Figs. 2 to 10 inclusive and 12.

Referring now to the drawings, the air conditioning system includes, in general a heat absorber section and a heat dissipating section. The heat absorber section may include an evaporator 10, over which air is blown by means of the fan 11 driven by the motor 12. The air blown by the fan 11 may be either fresh air from outside the car, recirculated air from the interior of the car, or both. The air, after it has been passed in contact with the evaporator 10 is distributed into the car passenger compartment by suitable ducts, discharge grilles and the like well-known in the art. An automatic control instrument 13 is placed in a position to be responsive to conditions within or outside the passenger compartment, or both inside and outside, for controlling the refrigeration produced on the air passing the evaporator 10. The heat dissipating section of the air conditioning apparatus may include a compressor 14 discharging refrigerant into the condenser 15 from whence liquefied refrigerant flows through the pipe 15a through the automatic expansion valve 16 into the evaporator 10. Thence the evaporator refrigerant returns through the line 17 to the compressor 14. The valve 16 may be of the type which automatically opens whenever the pressure in the evaporator 10 has been reduced to a desired pressure, and the valve may be provided with a thermostatic bulb 18 of the character which automatically throttles the valve 16 when the refrigerating effect in the evaporator 10 reaches the place where the bulb 18 is located. Preferably the temperature of the evaporator 10 is selected to produce a temperature sufficiently low to cool the air to the desired amount, but insufficiently low to freeze moisture on the coil surfaces. For this purpose, an automatic valve 19 may be provided on the suction line 17 which automatically throttles the line 17 and prevents the compressor 14 from reducing the refrigerant pressure in the evaporator 10 below the desired limit. While only an evaporator section and blower has been shown, it is to be understood that a plurality may be used.

The condenser 15 may be cooled by the circulation of air over the condenser. This may be accomplished by means of a blower 20 driven by the motor 21. If desired, a water spray 22 may be provided which may be connected to a water tank, not shown, on the car placed under pneumatic pressure from the air-brake system. The flow of water from the spray 22 may be automatically controlled by a valve 23 actuated by a thermostatic bulb 24 which automatically opens the valve 23 when the car temperature rises above the predetermined limit. If desired, a head pressure responsive bellows 25 is provided to stop the compressing operation of the compressor if the head pressure should rise abnormally.

The heat dissipating section of the air conditioning system, and particularly the compressor, may be connected with the live axle assembly and with a motor-generator in such a manner that the compressor is driven by the motor-generator, acting as a motor, throughout one car speed zone, which car speed zone may be below a certain speed limit, such as zero M. P. H. alone or zero M. P. H. to some higher speed limit, such as 15 M. P. H. Preferably another, or intermediate, car speed zone is automatically established such as from 15 M. P. H. to 30 M. P. H., in which the compressor may be driven from the live axle assembly while the generator is prevented from generating or operating at subnormal output. Still another, or higher car speed zone may be provided, such as at 30 M. P. H. and above, during which refrigeration is provided when required and during which generation is also produced by the motor-generator. According to a modified form of the invention, the generator output may be modified so that it is reduced while refrigeration is required and is increased when no refrigeration is required in order to reduce the amount of power to be transmitted by the mechanism. The particular speed limits are given by way of example, and may be varied, if desired.

If desired, a torque transmitting or variable ratio transmission device or means may be interposed between the live axle assembly and the compressor and, if desired, also between the motor-generator and the live axle assembly.

In the schematic representation shown in Fig. 1, the live axle assembly 50 may include one or more axles of the car. A relatively small generator or exciter 51 is driven proportionally to the speed of the car as indicated by the line 52. An automatic variable ratio drive 53 is driven from the live axle assembly as indicated by the line 54, and this in turn drives the motor-generator 55 and the compressor 14. Preferably a first pneumatic clutch, or clutch system, 56 is interposed between the variable ratio drive 53 and the motor-generator 55, and a second pneumatic clutch or clutch system 57 is interposed between the motor-generator 55 and the compressor 14. The actuation of these clutches is controlled respectively by the valves 58 and 59 interposed between the clutches and the air supply 60 which may be connected to the air-brake system of the car. The pneumatic clutches 56 and 57 may be of any type in which the injection of air into the clutches causes them either to clutch or declutch, depending on the control placed on the valves 58 and 59. While pneumatic clutches have been disclosed, it is understood that other types (such as those directly operated by solenoids, may be used.

The actual structure of the variable ratio drive may be somewhat similar to that disclosed in the application of Charles L. Paulus and Lester E. Perrine Serial No. 742,490 filed September 1, 1934 to produce a constant compressor and/or generator speed, or a speed of reduced variation range. As indicated in Fig. 13, in the preferred form, the live axle 50 drives a belt 61 which in turn drives a jack shaft 62 pivotally mounted about bearings coaxial with the driven shaft 63. One or more belts 64 are mounted about automatically variable V-pulleys 65 and 66 capable of automatically varying their effective diameters to vary the speed ratio between the shafts 62 and 63. This may be accomplished by providing a centrifugal governor, not shown, in the pulley structure 66 and a spring actuation 67 for the pulley structure 65. Details of this automatic variable ratio drive are disclosed in the application of Perrine and Paulus hereinbefore referred to, it being understood that any type of automatically variable ratio transmission may be used. The motor-generator 55 has its armature mounted on the shaft 63, which shaft is provided at one end with the pneumatic clutch 56 and at the other end with the pneumatic clutch 57. These clutches are controlled, respectively, by the solenoid valves 58 and 59. The shaft 63 is also provided with V-pulleys 70 which are connected by belts 71 with V-pulleys 72 on the shaft of the compressor 14. If desired, the exciter 51 may be driven from the jack shaft 62 although it may be driven from any shaft or axle responsive to car speed.

Proper automatic controls of the electrical parts of the apparatus are provided. Those portions which are necessarily responsive to the speed of the car may be controlled by any device which is so responsive to speed. In the wiring diagrams shown in Figs. 2 to 10 inclusive, and 12 the varying voltage of the exciter 51 (as indicated in Fig. 16) is utilized to actuate proper voltage responsive relays, while centrifugal switches are utilized in the modification shown in Fig. 11 in lieu of utilizing the varying voltage of the exciter armature. Consequently, where speed responsive switches are used, as in Fig. 11, the exciter 51*a* may be driven by any axle or shaft of the drive, or by a separate motor, if desired.

Figs. 2 to 8 inclusive disclose the various steps in the system under varying speed and refrigeration conditions. Thus in Fig. 2 the electrical parts are shown wholly deenergized due to the fact that the car is standing and no refrigeration or air conditioning is being produced. Figs. 3 to 8 inclusive show, in heavy lines, the various circuits rendered active under varying conditions as hereinafter more fully explained. Referring again to Fig. 2, the car is provided with a battery 80. Master switches 81, are provided which when closed, render the battery charging system operable. When master switch 82 is closed, the fan motor 12 and its voltage regulator 83 are energized. In addition, switch 82 renders the refrigerating system capable of being controlled by the various conditions of the car.

Referring now to Fig. 3, the car has a speed within its first speed zone (which may be zero alone or zero up to some relatively slow speed such as 15 M. P. H.). The switches 81, 82 are shown closed. This energizes the motor 12 which circulates air over the evaporator 10 and into the pasenger compartment and is in readiness to receive refrigeration if required. As shown in the wiring diagram of Fig. 3, however, no refrigeration is presumed to be required. The exciter field 84 is shown energized so that the exciter is ready to produce voltages in response to car speeds. A current is produced by the armature of the exciter 51, this current being indicated by the arrows 85. Up to 15 M. P. H. this current is not sufficiently high to actuate any relays as indicated by Fig. 16. The circuit through the valve 59, of the clutch 57, is energized at this time to cause a mechanical connection between the motor-generator and the compressor 14. This insures that a proper load shall be placed on the motor before it is started, prevents racing of the motor and burning out of the clutch.

Referring now to Fig. 4, the circuit is shown in its first car speed zone (say zero alone or zero to 15 M. P. H.) when refrigeration is required, the energy to be derived from the battery 80. Thus the switches 81 and 82 are closed to start the motor 12. In addition, the thermostatic switch 13, is closed. This switch may be operated by any instrument responsive to air conditions, such as dry bulb, wet bulb, relative humidity or effective temperatures within the pasenger compartment or outside the passenger compartment, or responsive to conditions both inside and outside the car. When the switch 13 is closed, the head pressure responsive switch 25 being normally closed, the solenoid coil 87 is energized, thus closing the switch 88 and energizing the condenser fan motor 21 which blows air over the condenser 15. When the thermostatic bulb 24 closes the switch 89, in response to high air temperatures, the condenser spray valve 23 is operated to spray water over the condenser. The exciter voltage being insufficient to actuate the series of switch contacts connected to the operating lever 90, the contacts 91 are closed to energize the solenoid 92, which in turn closes the switch 93. The motor-generator 55 now starts as a motor, and the compressor 14 is driven thereby. This operation is acomplished by the energization of the solenoid 94 which in turn sequentially closes the various contacts of the motor starter 95 thus causing current to flow through the motor armature directly from the battery through wire 96 and through the motor field 97 via the switch 98. Pneumatic time delays 99 and 100 are provided for the switches 93 and 95. The purpose of the time delay 99 is to insure that the clutch 57 shall first be energized, say five seconds before the switch 93 is closed as described with respect to Fig. 3. The time delay 100 permits the sequential closing of the contacts of the motor starter 95 to permit proper acceleration of the motor with minimum current surges. The exciter armature is producing current, but not of a sufficiently high value to actuate any switches connected to it, as previously described with respect to Fig. 3.

Referring now to Fig. 5, the car is presumed to be in its second car speed zone, which may be between 15 and 30 M. P. H. The switches 81 and 82 have been closed previously, thus energizing the motor 12. No refrigeration is required at this time, and hence the thermostatic switch 13 is open. The exciter field 84 has been energized previously, and the speed of the armature of the exciter 51 has increased to the point where the current through the lines 101, 102, 103 and 104 is sufficiently high to actuate relay 105. This relay removes to the right all of the switch contacts connected to the operating lever 90. Contacts 106 close to energize the solenoid 107. This in turn closes the contacts 108 with a time delay caused by the pneumatic delay device 109. This in turn energizes the solenoid valve 58 to operate the pneumatic clutch 56, causing the motor-generator armature to rotate, but providing no generation because the generator armature circuit is not completed to the battery at this time. The solenoid 110 is also energized when the contacts 108 are closed. This in turn closes the contacts 111 with a time delay due to the device 112. These contacts 111 being closed in series with contacts 113, which were closed previously by the solenoid 105, place the circuit including valve 59 in readiness to be actuated to clutch the clutch 57 as the switch 13 closes when refrigeration is required. It is to be noted that there is a time delay between the actuation of the solenoid valves 58 and 59, thus insuring that the generator and the compressor cannot simultaneously be thrown onto the drive while their respective moving parts are idle. The contacts 113a are also closed by the solenoid 105, permitting excited output current to pass through solenoid 115, but of insufficient value to actuate the operating lever 118.

Referring to Fig. 6, the car is in its second car speed zone, which may be between 15 and 30 M. P. H. Refrigeration is presumed to be required and therefore switch 13 has been closed by the device responsive to air condition. The switches 81 and 82 have been previously closed by hand operation and therefore the evaporator blower motor 12 is energized. The head pressure responsive switch 25 being normally closed, the solenoid 87 is energized, thus energizing the condenser blower motor 21 and placing the spray valve 23 under the control of the thermostatic switch 89 to spray the condenser with water if necessary. The exciter field 84 has been energized by closure of switch 82, and the speed of the exciter armature produces a voltage sufficient to energize the circuit 101, 102, 103 and 104 in the manner heretofore described to energize sufficiently the solenoid 105, and the relays 107 and 110 as described with respect to Fig. 5. The closing of the switch 13 causes current to pass the contacts 113 and 111 thus energizing the solenoid valve 59 and clutching the clutch 57 between the motor-generator and the compressor. This insures operation of the compressor. No generation is produced, however, since the generator armature circuit has not been completed to the battery, and since the generator field 97 is not energized.

Fig. 7 shows the circuit when the car is in its third car speed zone, such as at 30 M. P. H. and above, during which generation is produced but no refrigeration. The switches 81 and 82 have been previously closed by hand operation thus causing operation of the motor evaporator blower 12 and energization of the exciter field 84. The exciter armature has a sufficiently high voltage to operate the relays 105, 107, 110 in circuit 101, 102, 103 and 104 in the manner previously described with respect to Fig. 5. The exciter armature voltage has now risen sufficiently to operate the contacts via solenoid 115 and operating lever 118, opening contacts 98 and closing 116 and 117. This operation permits the exciter 51 to energize the generator field 97 through lines 97a and contacts 117.

A coil structure 120 is provided, which, by magnetic reaction with potential coil structure 120a, closes the switch 121 when the voltage across the armature of the motor-generator is suitable for battery charging. This operation places the motor-generator in circuit with the battery, as a generator. Immediately upon the closing of the switch 121, the coil 125 is placed in the circuit. The coil 125 and the potential coil 123 independently regulate the resistance 126 in series with the exciter field 84 in accordance with the normal requirements of battery charging. Coil 125 also serves to hold shut switch 121 during the battery charging period. Since the resistance 126 governs the strength of the exciter field 84, and since field 84 governs the exciter armature voltage and therefore the current through generator field 97, the generator output is thus indirectly regulated by the coils 123 and 125. Coil 123 limits the maximum voltage of the generator at any time, which value may be adjusted by a resistor in series with coil 123, or by an adjustable restraining spring device 126a. Coil 125 responds to all or a portion of the generator output current, and is so connected to resistance 126 that generator current in excess of a predetermined value through coil 125 increases the value of resistance 126 independently of the requirements of coil 123. This action limits the generator output current to any definite value, regardless of maximum voltage adjustments. This may be accomplished by a lost-motion device or other mechanical means.

When the generator output voltage decreases below that of the battery, the current through switch 121 and coil 125 reverses. Coil structure 125 opens switch 121 by magnetic reaction with potential coil structure 120a, preventing damage to the generator armature.

An adjustable resistance 131 may be placed in parallel with coil 125. This resistance 131 may be manually adjustable, as indicated in Figs. 2 to 8, 11 and 12 or may be both manually and automatically adjustable as indicated in Figs. 9 and 10. This resistance 131 is used, in conjunction with coil 125, to regulate the total generator output current charging the battery.

Fig. 8 shows the wiring diagram when the car is in its third car speed zone, such as 30 or more M. P. H., when refrigeration is required, and when generation is being produced. The switches 81 and 82 are in the same position as in Fig. 7 thus energizing blower motor 12. The generator and exciter circuits are the same as shown with respect to Fig. 7. However, the switch 13 has now been closed by the thermostatic or air conditioning device which energizes the line 130. This in turn energizes the solenoid 87 thus energizing condenser blower motor 21 and placing water spray valve 23 under the control of switch 84. The energization of the line 130 also energizes the solenoid valve 59 thus clutching clutch 57 and causing the compressor 14 to operate to produce the required refrigeration.

Figs. 9 and 10 are somewhat similar to Figs. 7 and 8, and show a modification in which the output of the motor-generator is modified, in such a manner that the generator output is reduced when refrigeration is being produced, to relieve the load on the transmission mechanism. This is accomplished by providing an automatically variable resistance 131 in parallel with the coil 125. The variable resistance is under control of solenoid 132, which operates the switch 133. Fig. 9 shows a condition where no refrigeration is required, and the car is traveling in its highest car speed zone, such at at 30 M. P. H. or more. The switch 13 is therefore open and the coil 132 is not energized. This permits the switch 133 to remain closed so that a relatively low resistance circuit is placed in parallel with the coil 125. This permits a relatively large amount of current to flow between the motor-generator 55 and the battery before the coil 125 can become operative on the resistance 126. However, when the switch 13 is closed, as shown in Fig. 10, under requirement for refrigeration, the solenoid 132 is energized, the switch 133 is thereby opened, and the generator output is reduced by the fact that resistance 131 is increased in value. Since the current through coil 125 is fixed in value according to a predetermined adjustment, the total generator current output is reduced by the increase of resistance 131. The operation described limits the output of the motor-generator 55 to a fraction of that of Fig. 9.

Fig. 11 shows a modification in which a mechanical arrangement of centrifugal switches are used to govern certain parts of the system in lieu of an electrical arrangement using a varying exciter voltage and associated relay coils. The corresponding arrangement of parts is diagrammatically indicated in Fig. 14. Thus a centrifugal device 140 is provided to operate the switches connected to the operating lever 90 in lieu of the solenoid 105. In addition, a thermostatic delay device 141 is provided to produce a time delay in the operation of switch 108 in lieu of pneumatic device 109. The remainder of the circuit is the same as that previously described with respect to Figs. 2 to 10 inclusive, with the further exception that the exciter armature circuit 101, 102 and 103 can be omitted, and the exciter itself be driven by any means and independently of car speed, if desired. The centrifugal device 142 is also provided in lieu of the solenoid 115. The construction is such that the centrifugal device 140 actuates the operating lever 90 with a snap action to open and close associated contacts at the same car speeds as described for solenoid 105. Centrifugal device 142 similarly replaces solenoid 115.

It is to be noted, that the time delay devices 99 and 120 may be changed from pneumatic devices to thermostatic delay devices of the same character as shown at 141, in a manner more fully described with respect to Fig. 12.

The operation of the thermostatic time delay device 141 is as follows: When the car speed reaches 15 M. P. H. contacts 106 are closed. This permits current to flow through the bi-metal 145 through the resistance 147 via switch 146. The bi-metal 145 is restrained at one end only, and after a five second or other suitable interval, bends until it closes upon the contact 148. This energizes the solenoid 149 which closes the contacts 108 and transfers switch 146 to the left. Current then bows through the bi-metal 145, switch lever 146, line 150 and solenoid 149. This current continues to flow after contacts 148 reopen due to cooling of the bi-metal. The resistance of 149 being much greater than that of 147, the bi-metal 145 can cool and move away from 148, the coil 149 acting as a holding coil for contacts 108 and switch lever 146 as long as the switch 106 remains closed. When the speed reaches 30 M. P. H. the centrifugal device 142 moves its corresponding operating lever 118 and produces a similar action in the motor-generator field and armature as that described with respect to Figs. 7, 8, 9 and 10, it being understood that the automatic output regulator shown in Figs. 9 and 10 can be incorporated in Fig. 11.

In the modification shown in Fig. 12, the time delay devices 99, 109 and 112 have been displaced by thermostatic time delay devices 160, 161 and 162. Otherwise, the circuit shown in Fig. 12 can be similar in operation to that described with respect to Figs. 2 to 10 inclusive. When the speed of the car reaches 15 M. P. H., the solenoid 165 is energized thus moving operating lever to close contacts 166, causing current to flow through the bi-metal 164, switch 165 and resistance 166, similarly to Fig. 11. The bi-metal 164 bends to the contact 167 with a time delay, and, when it touches contact 167, energizes solenoid 168 moving switches 165 and 169 to the left. Thereafter the circuit is maintained through switch 166, bi-metal 164, switch 165, line 170 and solenoid 168, to maintain the switch 169 closed and to energize the clutch valve 58. Thereafter current will flow through the bi-metal 171 which will cause the closing of switch 173 with a time delay in the manner similar to that described with respect to device 160, closing of the switch 172 energizing the clutch valve 59. Similarly, whenever the switch 91 is closed and its circuit energized, the bi-metal 175 closes upon the contact 176 with a time delay and causes the closing of switch 177. This in turn causes current to flow through solenoid 94 of the motor starter 95. The other parts of the system operate the same as with respects to Figs. 2 to 8 inclusive, it being further understood that the total load limiting devices 131, 132 and 133 of Figs. 9 and 10 may also be incorporated into this circuit.

If desired the motor-generator with its associated clutch 56 may be placed on the driving side of the variable ratio drive, and the compressor on the driven side. Thus the live axle may drive the exciter and the motor-generator at speeds proportional to car speeds, while the compressor runs at a relatively constant speed whether in operation from the car axle or from the motor-generator as a motor. The clutch 56 is interposed between the car axle assembly and the generator and the clutch 57 is interposed between the compressor and the variable ratio drive or between the variable ratio drive and the generator.

When the vehicle is decreasing in speed through the various car speed zones the automatic sequence of operation is reversed. However, the actual car speeds at which these operations occur preferably are lower than those car speeds established for car acceleration, thus preventing frequent change of operation by slight and frequent changes of car speed from one zone to the other.

The control instrument 13 may be made manually adjustable to any desired setting. Also it may be made to be manually set to an open switch position. By manually setting it to the open position and by closing switch 82, ventilation of the car is provided by blower 11 of motor 12 without refrigeration until the instrument 13 is again manually reset for normal operation. Adjustable condition responsive instruments of this type are well known and therefore no further description is necessary.

While the form of embodiment of the invention as herein disclosed, constitutes a preferred form, it is to be understood that other forms might be adopted, all coming within the scope of the claims which follow.

What is claimed is as follows:

1. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor, energized from said battery, to drive said compressor independently of said live axle assembly when said vehicle is standing and, when said vehicle is in motion, to cause said live axle assembly to drive, through said torque transmitting means, said compressor and said motor-generator, said motor-generator acting as a generator to charge said battery, and means automatically maintaining the same direction of current generated by said motor-generator when the vehicle travels in either direction.

2. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor, energized from said battery, to drive said compressor independently of said live axle assembly when said vehicle is standing and, when said vehicle is in motion, to cause said live axle assembly to drive, through said torque transmitting means, said compressor and said motor-generator, said motor-generator acting as a generator to charge said battery, and means automatically maintaining the same direction of current generated by said motor-generator when the motor-generator is rotated in either direction.

3. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor, energized from said battery, to drive said compressor independently of said live axle assembly when said vehicle is standing and, when said vehicle is in motion, to cause said live axle assembly to drive, through said torque transmitting means, said compressor and said motor-generator, said motor-generator acting as a generator to charge said battery, and an exciter arranged to rotate in accordance with vehicle travel direction to excite the motor-generator field to maintain the same direction of current generated by said motor-generator when the vehicle travels in either direction.

4. In a vehicle; a live axle assembly; a compressor; a unitary motor-generator; a battery;

torque transmitting means from said live axle assembly to said compressor and motor-generator and between said compressor and motor-generator; control means, automatically responsive to vehicle running conditions, to cause said motor-generator to act as a motor, energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged as a generator to charge said battery, and means arranged automatically to connect said motor-generator, when it is acting as a generator, with said battery when the motor-generator voltage is sufficient to charge the battery and disconnecting said motor-generator when the motor-generator voltage is not sufficient.

5. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator, arranged as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged as a generator to charge said battery, an exciter to excite the field of the motor-generator, and means to regulate the output of the exciter to regulate the voltage of the motor-generator when it is acting as a generator.

6. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor, energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged as a generator to charge said battery, an exciter to excite the field of the motor-generator, and means to regulate the output of the exciter to regulate the current of the motor-generator when it is acting as a generator.

7. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor, energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged as a generator to charge said battery, and speed responsive means arranged to control the operation of the torque transmitting means and the operation of said motor-generator and including a relatively small, non-charging generator arranged to be driven in proportion to vehicle speed and relays energized thereby.

8. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator, arranged as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged as a generator to charge said battery, and speed responsive means control the operation of the direct drive mechanical means and the operation of said motor-generator and including a relatively small, non-charging generator arranged to be driven in proportion to vehicle speed and relays arranged to be energized thereby, said last named generator arranged to act as an exciter for the motor-generator field.

9. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator, arranged as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged as a generator to charge said battery, and speed responsive means to control the operation of the direct drive mechanical means and the operation of said motor-generator and including centrifugally controlled switches.

10. In a vehicle, a live axle assembly; a compressor; an evaporator; a condenser; said compressor, evaporator and condenser being in refrigerant flow relationship; a unitary motor-generator; a battery; torque transmitting means from said live axle assembly to said compressor and motor-generator and between said compressor and motor-generator; control means, automatically responsive to vehicle running conditions, to cause said motor-generator, arranged as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged as a generator to charge said battery, water spray means for said condenser, and means to control automatically said water spray means in accordance with compressor operating conditions.

11. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means to control the engagement of said second clutch means, and provisions for automatically changing said motor-generator between motoring from said battery and charging said battery in response to running and refrigeration conditions, and including a first relay to control said first clutch means; a second relay to control said second clutch means, an exciter having an output in accordance with vehicle speed and arranged to control the energization of said first relay, and excite the field of said motor-generator.

12. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor generator and compressor; second clutch means between said motor-generator and compressor; speed responsive means to cause said first clutch means to disengage below a certain speed limit, refrigeration responsive means to control the engagement of said second clutch means, and provisions for automatically changing said motor-generator between motoring from said battery and charging said battery in response to running and refrigeration conditions, and including a first relay to control said first clutch means; a second relay to control said second clutch means, an exciter having an output in accordance with vehicle speed and arranged to control the energization of said first relay, and arranged to introduce a time delay means in the circuit of said second relay, and to excite the field of said motor-generator.

13. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means to control the engagement of said second clutch means, provisions for automatically changing said motor-generator between motoring from said battery and charging said battery in response to running and refrigeration conditions, and means to insure a time delay between the engagement of said first and second clutch means.

14. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means to control the engagement of said second clutch means, provisions for automatically changing said motor-generator between motoring from said battery and charging said battery in response to running and refrigeration conditions, and means to cause said second clutch means to become engaged before said motor-generator is energized as a motor.

15. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means to control the engagement of said second clutch means, provisions for automatically changing said motor-generator between motoring from said battery and charging said battery in response to running and refrigeration conditions, and means to cause a time delay between the time that said torque transmitting means drives said compressor and the time that said motor-generator ceases to drive said compressor as a motor.

16. In a vehicle, a refrigerating system, an electrical system, a live axle system, connections between said systems and controls automatically controlling said connections in accordance with speed conditions of said car and in accordance with atmospheric conditions; said refrigerating system including a compressor-condenser and evaporator; said electrical system including a motor-generator and a battery; said controls arranged to act to cause said motor-generator to start and stop as a motor energized from said battery with mechanical connections to said compressor in accordance with temperature conditions throughout a first car speed zone, mechanical connections between said live axle system and said compressor, said controls arranged to act to cause said mechanical connections to connect and disconnect between said live axle system and said compressor in accordance with atmospheric conditions while preventing operation of said motor-generator as a generator throughout a second car speed zone, said mechanical connections including a mechanical connection between said live axle and the motor generator, said controls arranged to act to connect said live axle system and said motor-generator and operation of said motor-generator as a generator to charge said battery and to connect and disconnect between said live axle system and said compressor in accordance with atmospheric conditions throughout a third car speed zone.

17. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator, to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery.

18. In a vehicle; a like axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator, to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery, said control means including provisions to cause said compressor to perform a compressing action, while driven from said live axle assembly, at times when said motor-generator is not generating.

19. In a vehicle; a live axle assembly; a compressor; a unitary motor-generator; a battery; torque transmitting means from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is standing and, when said vehicle is in motion, to cause said live axle assembly to drive, through said torque transmitting means, said compressor, and said motor-generator, said motor-generator arranged to act as a generator to charge said battery, said control means including provisions to cause said motor-generator to perform a generating action while driven from said live axle assembly, at times when said compressor is not compressing.

20. In a vehicle; a live axle assembly, a compressor; a unitary motor-generator; a battery; torque transmitting means from said live axle assembly to said compressor and motor-generator and between said compressor and motor-generator; control means, automatically responsive to vehicle running conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator acting as a generator to charge said battery.

21. In a vehicle; a live axle assembly, a compressor; a unitary motor-generator; a battery; torque transmitting means from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator acting as a generator to charge said battery, said control means including provisions for causing said compressor to perform a compressing action, while driven from said live axle assembly, at times when said motor-generator is not generating.

22. In a vehicle; a live axle assembly; a compressor; a unitary motor-generator; a battery; torque transmitting means from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator arranged to act as a generator to charge said battery, said control means including provisions to cause said motor-generator to perform a generating action while driven from said live axle assembly, at times when said compressor is not compressing.

23. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions.

24. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions, the arrangement being such that said motor-generator can perform a generating action while driven from said live axle structure at times when said compressor is not compressing.

25. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions, the arrangement being such that said compressor can perform a compressing action while driven from said live axle structure at times when said motor-generator is not generating.

26. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions, the arrangement being such that said motor-generator can perform a generating action while driven from said live axle structure at times when said compressor is not compressing and that said compressor can perform a compressing action while driven from said live axle structure at times when said motor-generator is not generating.

27. In a vehicle; a live axle structure; a battery; a refrigerating system on said vehicle including an evaporator, condenser and a unitary motor-generator; a compressor, torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions, said refrigeration responsive means controlling the operation of said compressor when driven by said motor-generator acting as a motor.

28. In a vehicle; a live axle assembly; a compressor; a unitary motor-generator; a battery; torque transmitting means, including provisions for variations of drive ratio, from said live axle assembly to said compressor and motor-generator and between said compressor and motor-generator; control means, automatically responsive to vehicle running conditions, to cause said motor-generator, to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator acting as a generator to charge said battery.

29. In a vehicle; a live axle assembly; a compressor; a unitary motor-generator; a battery; torque transmitting means, including provisions for variations of drive ratio, from said live axle assembly to said compressor and motor-generator and between said compressor and motor-generator; control means, automatically responsive to vehicle running conditions, to cause said motor-generator, to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery, said control means including provisions to cause said compressor to perform a compressing action, while driven from said live axle assembly, at times when said motor-generator is not generating.

30. In a vehicle; a live axle assembly, a compressor; a unitary motor-generator; a battery; torque transmitting means, including provisions for variations of drive ratio, from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is standing and, when said vehicle is in motion, to cause said torque transmitting means to drive, through said direct drive mechanical means, said compressor and said motor-generator, said motor-generator arranged to act as a generator to charge said battery, said control means including provisions to cause said motor-generator to perform a generating action while driven from said live axle assembly, at times when said compressor is not compressing.

31. In a vehicle; a live axle assembly; a compressor; a unitary motor-generator; a battery; torque transmitting means, including provisions for variations of drive ratio, from said live axle assembly to said compressor and motor-generator and between said compressor and motor generator; control means, automatically responsive to vehicle running conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator acting as a generator to charge said battery.

32. In a vehicle; a live axle assembly; a compressor; a unitary motor-generator; a battery; torque transmitting means, including provisions for variations of drive ratio, from said live axle assembly to said compressor and motor-generator and between said compressor and motor-generator; control means, automatically responsive to vehicle running conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor or said motor-generator, said motor-generator arranged to act as a generator to charge said battery, said control means including provisions for causing said compressor to perform a compressing action, while driven from said live axle assembly, at times when said motor-generator is not generating.

33. In a vehicle; a live axle assembly; a compressor; a unitary motor-generator; a battery; torque transmitting means, including provisions for variations of drive ratio, from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator arranged to act as a generator to charge said battery, said control means including provisions for causing said motor-generator to perform a generating action while driven from said live axle assembly, at times when said compressor is not compressing.

34. In a vehicle; a live axle structure; a battery, a refrigerating system on said vehicle including an evaporator, condenser and a unitary motor-generator; a compressor, torque transmitting means, including provisions for variations of drive ratio, from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions.

35. In a vehicle; a live axle structure; a battery; a refrigerating system on said vehicle including an evaporator, condenser and a unitary motor-generator; a compressor; torque transmitting means, including provisions for variations of drive ratio, from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions, the arrangement being such that said motor-generator can perform a generating action while driven from said live axle structure at times when said compressor is not compressing.

36. In a vehicle; a live axle structure; a battery; a refrigerating system on said vehicle including an evaporator, condenser and a unitary motor-generator; a compressor; torque transmitting means, including provisions for variations of drive ratio, from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions, the arrangement being such that said compressor can perform a compressing action while driven from said live axle structure at times when said motor-generator is not generating.

37. In a vehicle; a live axle structure; a battery; a refrigerating system on said vehicle including an evaporator, condenser and a unitary motor-generator; a compressor; torque transmitting means, including provisions for variations of drive ratio, from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions, the arrangement being such that said motor-generator can perform a generating action while driven from said live axle structure at times when said compressor is not compressing and that said compressor can perform a compressing action while driven from said live axle structure at times when said motor-generator is not generating.

38. In a vehicle; a live axle structure; a battery; a refrigerating system on said vehicle including an evaporator, condenser and a unitary motor-generator; a compressor; torque transmitting means, including provisions for variations of drive ratio, from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions, said refrigeration responsive means controlling the operation of said compressor when driven by said motor-generator acting as a motor.

39. In a vehicle; a power source; a compressor; a unitary motor-generator; a battery; torque transmitting means from said power source to said compressor and motor-generator and between said compressor and motor-generator; control means, automatically responsive to the stopping of said power source, to cause said motor-generator, to act as a motor energized from said battery, to drive said compressor independently of said power source when said power source does not furnish power and, when said power source furnishes power to cause said power source to drive, through said torque transmitting means, said compressor and said motor-generator, said motor-generator arranged to act as a generator to charge said battery.

40. In a vehicle; a power source; a compressor; a unitary motor-generator; a source of electrical energy; torque transmitting means from said power source to said compressor and motor-generator and between said compressor and motor-generator; control means, automatically responsive to the power supplied and refrigeration conditions, to cause said motor-generator, to act as a motor energized from said source of electrical energy, to drive said compressor independently of said power source when said power source is not supplying power and, when said power source is supplying power, to cause said power source to drive, through said torque transmitting means, said compressor, and said motor-generator, said motor-generator arranged to act as a generator to supply electrical energy, said control means including provision to cause said motor-generator to perform a generating action while driven from said power source, at times when said compressor is not compressing.

41. In a vehicle; a power source; a compressor; a unitary motor-generator; a source of electrical energy; torque transmitting means from said power source to said compressor and motor-generator and between said compressor and motor-generator; control means, automatically responsive to the stopping of said power source, to cause said motor-generator, to act as a motor energized from said source of electrical energy, to drive said compressor independently of said power source when said power source does not furnish power and, when said power source furnishes power, to cause said power source to drive, through said torque transmitting means, said compressor and said motor-generator, said motor-generator acting as a generator to supply electrical energy.

42. In a vehicle; a first power source on said vehicle; a compressor; a second power source on said vehicle; a dynamo-electric machine having a single shaft; torque transmitting means between said shaft and said compressor; means for supplying power to said dynamo-electric machine from said first power source; control means, automatically responsive to the stopping of said first power source, to cause said dynamo-electric machine, to be energized from said second power source, to drive said compressor independently of said first power source when said first power source does not furnish power and, when said first power source furnishes power, to cause said first power source to supply power for operating both said dynamo-electric machine and said compressor.

43. In a vehicle, a compressor, a condenser and evaporator in refrigerant flow relationship, a rotating part moving in relationship with the movement of said vehicle, a variable ratio drive comprising a direct mechanical connection between said part and compressor, a motor operatively connected to said compressor, a source of electric current on said vehicle, circuit connections between said source of electric current and said motor, means for automatically changing the operation of said compressor from said variable ratio drive to said motor in accordance with the speed of said vehicle, and means creating a time lag between the operation of said compressor by the variable speed ratio and by said motor.

44. In a vehicle, a compressor, condenser and evaporator in refrigerant flow relationship, a variable ratio drive connected to an axle of said vehicle, torque transmitting means between said compressor and said variable ratio drive, a dynamo-electric machine connected to said drive, means for driving said compressor by energy from said dynamo-electric machine in accordance with conditions created by said evaporator.

45. In a vehicle, a compressor, condenser and evaporator in refrigerant flow relationship, a variable ratio drive connected to an axle of said vehicle, torque transmitting means between said compressor and said variable ratio drive, a dynamo-electric machine connected to said drive, means for driving said compressor by energy from said dynamo-electric machine in accordance with conditions created by said evaporator, means for forcibly flowing a stream of air in thermal contact with said evaporator, said last named means being driven by energy from said dynamo-electric machine.

46. Drive means for a refrigerant compressor for use in a vehicle comprising a variable ratio drive connected to an axle of said vehicle, torque transmitting means between said compressor and said variable ratio drive, a dynamo-electric machine connected to said drive, means for driving said compressor by energy from said dynamo-electric machine.

47. In combination with a vehicle, a compressor, a condenser, an evaporator, refrigerant flow connections between said compressor, condenser and evaporator, driving means including a rotating part, a direct mechanical connection between said part and compressor, a motor operatively connected to said compressor, a source of electric current for energizing said motor, means for changing the operation of said compressor from said driving means to said motor, and means creating a lag between the operation of said compressor by said driving means and by said motor whereby operation of said compressor by said motor is prevented until said compressor has stopped.

DONALD F. ALEXANDER.
CHARLES F. HENNEY.
CHARLES L. PAULUS.